United States Patent
Sala et al.

(10) Patent No.: US 9,367,119 B2
(45) Date of Patent: Jun. 14, 2016

(54) SYSTEM AND METHOD TO REDUCE POWER CONSUMPTION IN A MULTI-SENSOR ENVIRONMENT

(71) Applicant: Maxim Integrated Products, Inc., San Jose, CA (US)

(72) Inventors: Leonardo Sala, Cornaredo (IT); Igino Padovani, Novate Milanese (IT); Simone Sabatelli, Pisa (IT)

(73) Assignee: Maxim Integrated Products, Inc., San Jose, CA (US)

( * ) Notice: Subject to any disclaimer, the term of this patent is extended or adjusted under 35 U.S.C. 154(b) by 727 days.

(21) Appl. No.: 13/657,067

(22) Filed: Oct. 22, 2012

(65) Prior Publication Data
US 2015/0206682 A1 Jul. 23, 2015

(51) Int. Cl.
*H01H 47/00* (2006.01)
*G06F 1/32* (2006.01)

(52) U.S. Cl.
CPC .............. *G06F 1/325* (2013.01); *G06F 1/3287* (2013.01); *Y10T 307/74* (2015.04)

(58) Field of Classification Search
USPC ........................................... 307/116; 706/12
See application file for complete search history.

(56) References Cited

U.S. PATENT DOCUMENTS

| 2001/0041963 | A1* | 11/2001 | Estes | G01C 19/38 702/6 |
| 2008/0012557 | A1* | 1/2008 | Hammerschmidt | B82Y 25/00 324/252 |
| 2008/0117037 | A1* | 5/2008 | Kenny et al. | 340/447 |
| 2009/0054737 | A1* | 2/2009 | Magar | A61B 5/0205 600/300 |
| 2010/0313050 | A1* | 12/2010 | Harrat | G06F 1/3203 713/323 |
| 2011/0202152 | A1* | 8/2011 | Barton | F41B 5/14 700/91 |
| 2012/0100895 | A1* | 4/2012 | Priyantha | H04W 52/0293 455/574 |
| 2013/0110450 | A1* | 5/2013 | Kulik | G01C 17/38 702/141 |
| 2013/0238535 | A1* | 9/2013 | Leppanen | G06N 99/005 706/12 |

* cited by examiner

*Primary Examiner* — Jared Fureman
*Assistant Examiner* — Emmanuel R Dominique
(74) *Attorney, Agent, or Firm* — North Weber & Baugh LLP

(57) ABSTRACT

Various embodiments of the invention provide for fully-integrated, low-latency power reduction in multi-sensor systems. In certain embodiments, power consumption is minimized by modulating power and mode of operation of gyroscopes, magnetometers, and accelerometers under certain conditions. Certain embodiments provide for reduction of power consumption by the use of emulated gyroscope data.

21 Claims, 4 Drawing Sheets

SYSTEM AND METHOD TO REDUCE POWER CONSUMPTION IN A MULTI-SENSOR ENVIRONMENT

BACKGROUND

A. Technical Field

The present invention relates to sensor power management, and more particularly, to systems, devices, and methods of integrating electromagnetic and inertial sensors into dynamically managed systems to reduce sensor power consumption.

B. Background of the Invention

There is an increasing trend to integrate multiple sensors, such as accelerometers, gyroscopes, and magnetometers within a single package. Sensors are becoming increasingly inexpensive and have been adopted by the marketplace for use in numerous applications. Accelerometers enable users of consumer electronics to do various tasks in a convenient way, e.g., portraits-landscape conversion or detection of certain events, such as shaking and other movement. Accelerometers typically measure acceleration in one or more dimensions. Spatial acceleration is measured by detecting the difference in three different components about three orthogonal axes, from which angles can be determined. By comparing angles along time, assuming no accelerations other than gravity are present, the angular velocity can then be derived.

Although, in practice, accelerometers provide an absolute reference for gravity, they come with a number of limitations that make them impractical for accurately measuring rotation. Most importantly, accelerometers are not designed to distinguish rotational movement from linear acceleration, because they sense every component of acceleration, including static and dynamic acceleration. Thus, injected lateral movements are perceived by the accelerometer as unwanted disturbances of a rotation based on the difference between angles. Additionally, accelerometers are relatively noisy. As a result, without having additional orientation information, acceleration sensors are not suited for detecting the difference between dynamic and static acceleration.

In contrast, gyroscopes or angular rate sensors are perfectly suited to measure rotation. They are designed to exclusively sense rotational orientation and to reject the disturbances caused by linear acceleration. However, gyroscopes do not possess absolute reference information. Thus, even when an angular rate sensor is motionless and experiences no actual angular rotation, i.e., the RMS value of the estimated rotation angle remains zero, once the inherently noisy output signal of the sensor is integrated with respect to time, the estimated rotation angle will be a nonzero. As a result, a slow angular drift occurs, which can be described by the "random walk" theory.

Existing approaches combine a gyroscope with appropriate, accurate parameters from a low bandwidth accelerometer, to compensate for the slow drift of the gyroscope. However, while accelerometers are able to compensate for the drift of the gyroscope in a pitch & roll plane, they are unable to compensate for drifts around a vertical axis (yaw) of the gyroscope, since the accelerometer lacks an absolute reference for the earth's magnetic North pole. One solution is to add a magnetometer to the combination of gyroscope and accelerometer to compensate for the drift of the gyroscope around the yaw axis, since a magnetometers' magnetic field sensor provides the absolute reference that is lacking from an accelerometer.

However, combining multiple sensors results in a relatively high power consumption which must be sustained by system integrators and which cannot be significantly reduced, especially, as long as the gyroscope is turned on. Today, the average power consumption of a gyroscope available on the market largely exceeds 10 mW. Since the gyroscope is generally a stand-alone object, turning it on or off in real time to manage power requires an application processor that passes data to and from the gyroscope in order to control the gyroscope's turn on and off times. This process is typically managed by software and suffers mainly from two inherent limitations, including time delays and heightened power requirements. Otherwise possible power savings resulting from short-term, e.g. 1 ms, turn off times, are made impractical by the slow timing resolution of software operating systems. Also, power savings resulting from long-term, e.g. 50 ms, turn off times are prevented by the inherently slow turn-on time of the gyroscope. Additionally, software-based approaches require the constant operation of an application processor, for example, to enable data communication to interrogate the accelerometer to determine the proper timing when to turn on and off the gyroscope. This contributes to the increase in data traffic, CPU cycles, and power consumption. Overall, software-based approaches prevent system integrators from achieving significant power savings.

What is needed are methods, devices, and systems that fully integrate sensor power management to overcome the above-mentioned limitations and leverages the superior sensing performance of a gyroscope while reducing gyroscope average power consumption below 5 mW.

SUMMARY OF THE INVENTION

A fully-integrated, low-latency approach to power reduction in multi-sensor systems is presented. Various embodiments provide for a programmable power management architecture that reduces sensor power consumption by minimizing, based on dynamic conditions, including actual power consumption, the time during which sensors operate at full power. Various embodiments use a hardware-based approach that, based on a set of predetermined criteria, queries a combination of sensor data to modulate power and mode of operation of gyroscopes, magnetometers, and accelerometers to reduce power consumption. In some embodiments, under certain conditions when the gyroscope is not strictly needed to provide rotation data, the magnetometer, the accelerometer, or both provide data that are used to emulate virtual gyroscope data.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
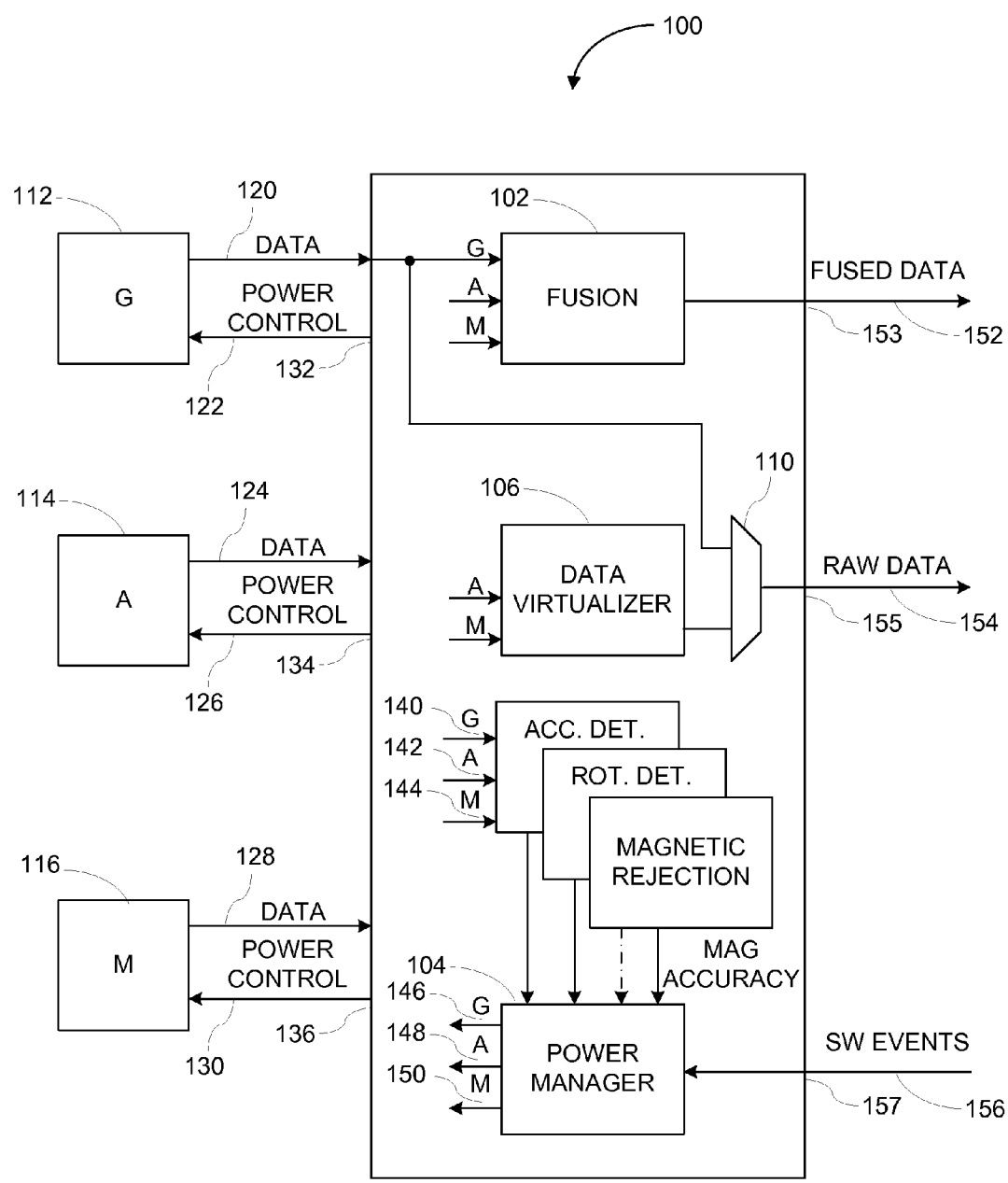
FIG. 1 is an illustration of a power management system to control the power consumption of a multi-sensor system.

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In various embodiments presented, an integrated dynamic sensor power management scheme dynamically turns off a gyroscope whenever conditions allow for it, e.g., when the gyroscope is not actively used for periods of time. For example, to reduce the power budget of a smart phone, the gyroscope used by an application can be turned off during a phone call without having to exit the application.

Combining an accelerometer with a magnetometer allows system integrators to replace some of the functions of a gyroscope, since the system can obtain all the necessary absolute references to accurately orient an object in space, leaving no unknown parameters. Unfortunately, this combination is still prone to the type of noise generated by both the accelerometer and the magnetometer, as discussed previously; especially, at higher frequencies. For example, operating a magnetometer with a 100 Hz bandwidth would cause the magnetometer to capture external magnetic interferences caused by such things as nearby electronic equipment, which would result in an extremely noisy compass. Therefore, only in limited bandwidth situations, such as for slow movements, can accelerometers and magnetometers be combined to relatively accurately detect rotation. In applications that require the detection of more rapid movements, such as in gaming applications, a gyroscope is the preferred method of detecting rotation. The fully-integrated, low-latency approach described herein leverages the superior sensing performance of a gyroscope while reducing gyroscope average power consumption below 5 mW.

FIG. 1 illustrates a power management system to control the power consumption of a multi-sensor system. Power management system 100 may comprise fusion module 102 that combines data, such as angular data, provided by a set of internal or external sensors, for example, gyroscope data 120, accelerometer data 124, and magnetometer data 128, that may be coupled to system 100 via a plurality of serial interfaces 132, 134, 136. System 100 further comprises power manager 104 that is designed to receive sensor data, including data from one or more of the set of sensors. Power manager 104 communicates to one or more sensors via a control signal 122, 126, 130 to manage their operation.

Gyroscope 112 is a sensor, such as a three-dimensional angular rate sensor, that measures rotation rates of angular positions and outputs one or more corresponding data signals 120. Typically, gyroscope 112 has a bandwidth that exceeds 300 Hz. In operation, gyroscope 112 consumes about 5 mW of power. In contrast, gyroscope 112 consumes practically no power when it is turned off. Accelerometer 114 is a sensor that measures acceleration by sensing linear translation and outputs one or more corresponding data signals 124. Magnetometer 116 is a magnetic field strength sensor that provides an absolute reference for magnetic North via one or more corresponding data signals 128.

In one embodiment, power management system 100 is configured to monitor, using power manager 104, three degrees of field strength using magnetometer 116, three degrees of linear motion using accelerometer 114, and three degrees of angular motion via gyroscope 112, resulting in a nine-degree-of-freedom sensor system capable of tracking the orientation and movements of an object in space via digital sensor output data signals 120, 124, 128.

Power manager 104 communicates, for example, via a digital power control signal 132, 134, 136, a decision which of sensors 112, 114, 116 to activate or deactivate at any given moment in time. One of more sensors 112, 114, 116 may be activated and deactivated in any combination that helps to reduce power overall consumption.

In one embodiment, based on the status of accelerometer 114 or magnetometer 116 or both, power manager 104 determines whether to deactivate gyroscope 112. The complete turning off of gyroscope 112 presumably provides the largest power saving, since accelerometer 114 and magnetometer 116 typically consume significantly less power than gyroscope 112. In one embodiment, both accelerometer 114 and magnetometer 116 may remain operational and active at all times and are constantly monitored by hardware or software in order to continue to provide status information about their conditions to power manager 104.

Additionally, power manager 104 may receive information about internal or external software events 156, for example, at software input interface 157 coupled to power manager 104. The information received via software events may include user settings, software interrupts, and software configurations regarding user responsiveness expectations. In other instances, power manager 104 reacts to actually measured sensor data. For example, when the sensor output signal of magnetometer 116 substantially exceeds a predetermined threshold indicative of a source of magnetic interference, such as a set of large loudspeakers in the vicinity of magnetometer 116. Such interference would give rise to unreliable magnetometer data 128 and cause power manager 104 to react to the significant increase in the sensor output signals by temporarily rejecting the error-ridden magnetometer data 128 until a normal condition is restored.

In one embodiment, data provided by gyroscope 112, accelerometer 114, and magnetometer 116 can be combined within fusion module 102 to generate fused angular data 152, which is used to estimate orientation, i.e., angles and angular speed of a moving object coupled to gyroscope 112, accelerometer 114, and magnetometer 116. The angular speed of an object in space can be statically and dynamically accurately determined from sensor readings collected about multiple axes, for example, by generating quaternions. (Quaternions are a preferred way of representing orientation for gyroscopes based on the fact that they are mathematically easy to manipulate than, for example, Euler angles.) Unlike, in cases when only gyroscope 112 is used, the system does not experience any sort of deviation if no movement is detected for any length of time, i.e., the gyroscope data does not drift but remains accurate over a relatively large bandwidth, for example, from DC to several hundreds of Hertz.

The combination of gyroscope 112, accelerometer 114, and magnetometer 116 allows capturing motion quickly and determining orientation accurately with respect to absolute references. One of ordinary skill in the art would appreciate that gyroscope 112, accelerometer 114, and magnetometer 116 as well as additional control systems, non-motion sensors, and data storage may be implemented within power management system 100.

In one embodiment, power management system 100 may further include data virtualizer 106, designed to receive sensor data, such as accelerometer data 134, and magnetometer data 136. Data virtualizer 106 outputs raw data 154, for example, at raw data output interface 155 via multiplexer 110. Under specific conditions, data virtualizer 106 combines data provided by accelerometer 114 and magnetometer 116 to mimic the behavior of gyroscope 112 in order to output raw data 154 that may substitute for real gyroscope raw data, to further increase the power savings aspect of power management system 100. In limited bandwidth and low data rate applications characteristic of relatively small injected noise levels, such as in an application involving a slow-moving television pointer, for example, data virtualizer 106 may generate virtual gyroscope raw data 154 from the sensor output signals of accelerometer 114 to substitute for gyroscope data 120. In another embodiment, data virtualizer 106 may generate virtual gyroscope raw data 154 from a combination of the sensor output signals of accelerometer 114 and magnetometer 116.

In some instances, virtualized angular rotational raw data 154 may be insufficient and gyroscope data 120 may be required in addition to virtual data. For example, a software application may be written in such a way that it specifically calls for gyroscope data 120. In these situations, data virtualizer 106 may employ multiplexer 110 to directly output real gyroscope data 120.

Raw data 154 and fused angular data 152 from each sensor, including information about orientation, may be passed for further processing to an operating system software driver, including to an application program interface (API) at the application interface level (not shown).

Figure 2:
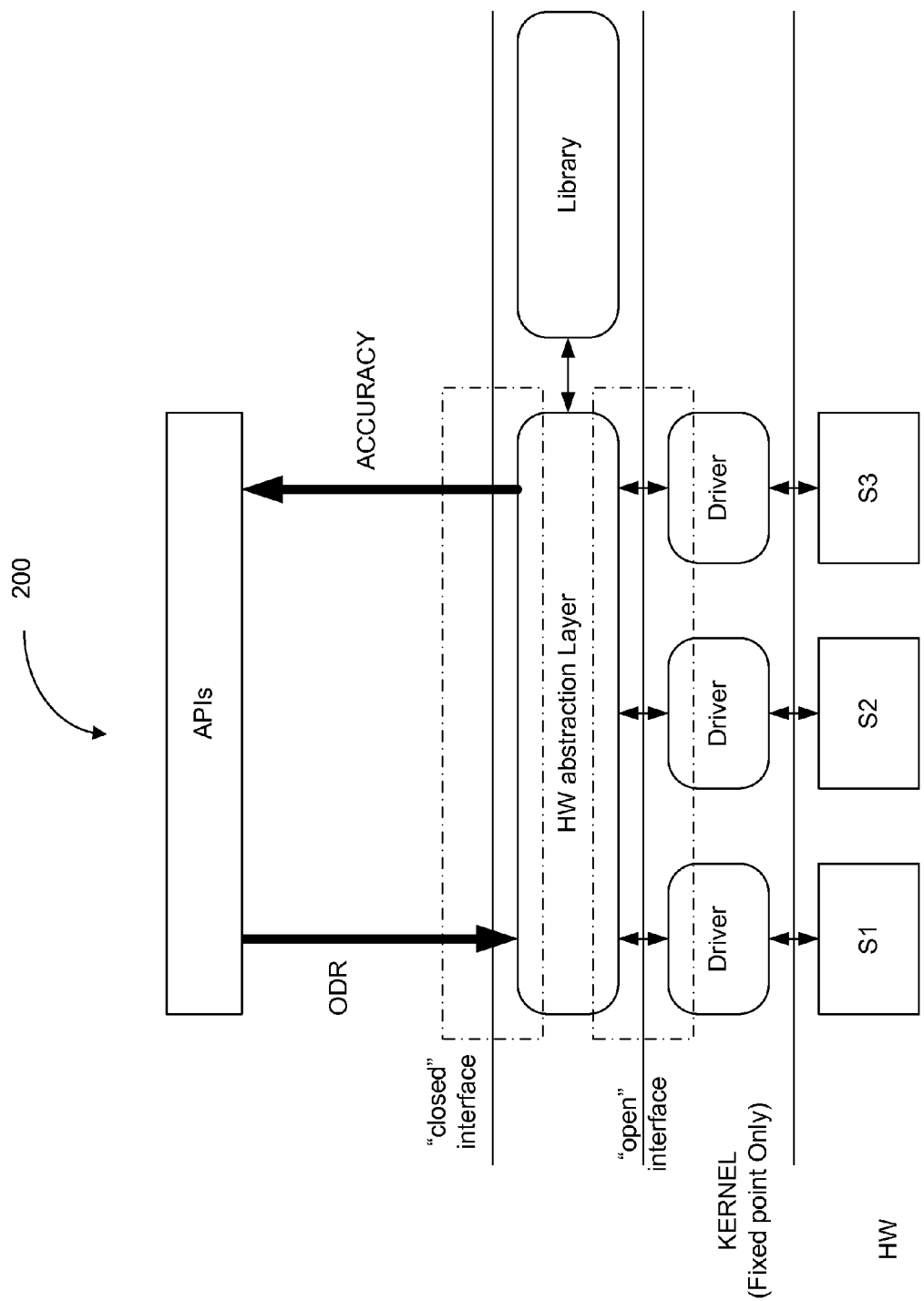
FIG. 2 illustrates a typical structure of the software layers of a modern operating system for mobile phones.

FIG. 2 illustrates a typical structure of the software layers of a modern operating system for mobile phones.

Figure 3A:
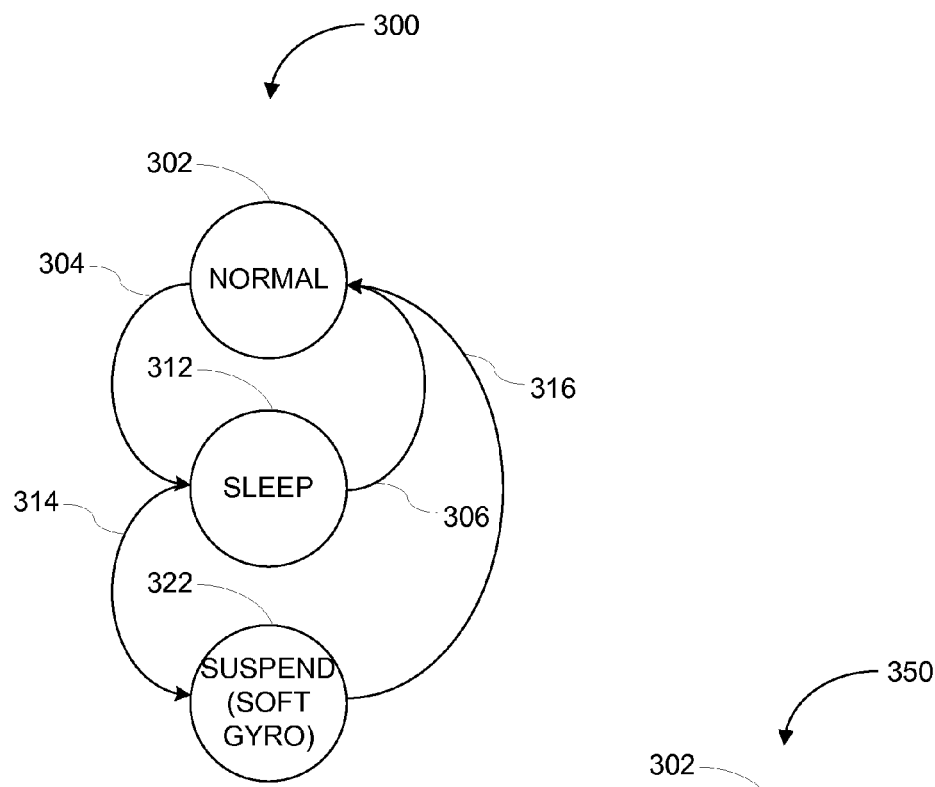
FIG. 3A is an illustrative example of a finite state machine (FSM) implementation of the power management of sensors for a fast usage model.

FIG. 3A is an illustrative example of an FSM implementation of the power management of sensors for a fast usage model. Three different power modes are presented. Normal mode 302, Sleep mode 312, and suspend mode 322.

In one embodiment, in all three power modes, the accelerometer and the magnetometer are always turned on. In normal mode 302, which may be the default setting, the gyroscope is always turned on; in sleep mode 312, which is a first power save condition, the power consumption of the gyroscope is reduced, for example from 5 mW to 3 mW; and finally, in suspend mode 322, which is a second power save condition, the gyroscope is always turned off or in a non-active state. From an efficiency perspective, it is desirable to remain in suspend mode 322 as long as possible, in order to minimize the power consumption.

Assuming that, for example, the operating system or the application (pre-) selects a setting that corresponds to a fast usage model for finite state machine 300, such as for a gaming application, then state machine 300 typically remains in normal mode 302 most of the time. If no significant movement is detected for a predetermined length of time, e.g. 20 ms, state machine 300 transitions into sleep mode 312. In sleep mode 312, the power consumption is reduced from for example 5 mA to 3 mA to allow a reasonably quick recovery, in the order of a few ms, as opposed to the tenths of ms that are required to recover from a suspend mode, as will be described in the next paragraph. Upon detecting an event, for example, a movement or a software event, state machine 300 is able to relatively quickly transition from the low power sleep mode 312 back to normal mode 302 to resume full normal operations. Typically, this transition takes place in less than 1 ms, which, in gaming applications, constitutes a negligible delay in terms of user experience. In sleep mode 312, the accelerator and magnetometer remain turned on and continue to provide rotation information to both the quaternion output and the raw data virtualizer output.

If no significant movement is detected for an extended period of time, for example 10 seconds, e.g., the gyroscope has not been used for a longer period of time, state machine 300 may transition from sleep mode 312 to suspend mode 322. In one embodiment, state machine 300 assumes suspend mode 322 only after at least one additional condition is satisfied, for example, that the accuracy of the magnetometer is sufficiently reliable.

In suspend mode 322, the gyroscope is completely turned off to further increase the power savings. The power consumption of the gyroscope in suspend mode 322 is virtually zero, e.g., less than 10 μW. Once in suspend mode 322, for applications where the bandwidth involved is relatively limited, the magnetometer and accelerometer may be combined to provide emulated virtual rotational data mimic the behavior of gyroscope, as previously described.

Upon detecting an event while in suspend mode 322, e.g. a rotation, a shaking event, or detecting an unacceptably low accuracy in magnetometer data, state machine 300 transactions back to normal mode 302. In one embodiment, the condition to exit from suspend mode 322 may be the crossing of a predetermined threshold value of the accelerometer output data or the magnetometer output data. In most instances, sleep mode 312 would be used where the bandwidth is large and it is desirable to quickly recover to normal mode 302.

Figure 3B:
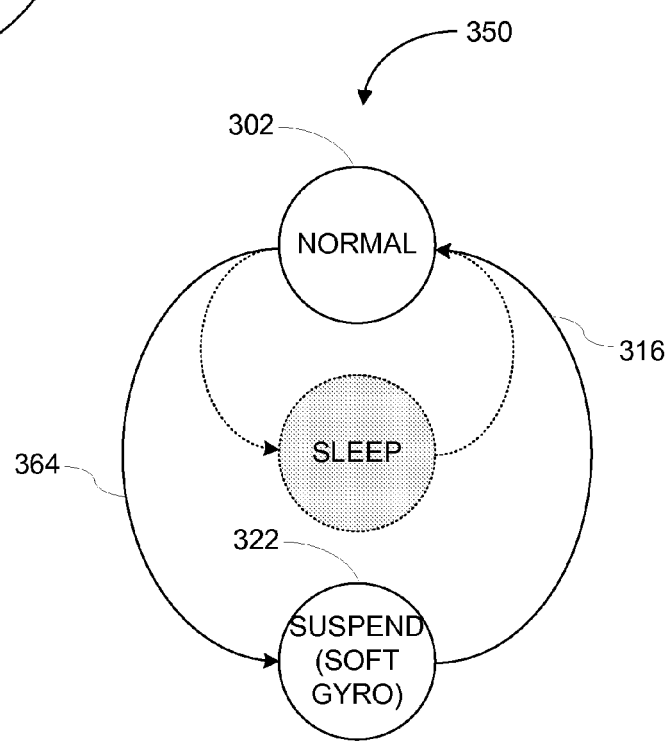
FIG. 3B is an illustrative example of an FSM implementation of the power management of sensors for a slow usage model.

FIG. 3B is an illustrative example of an FSM implementation of the power management of sensors for a slow usage model. Assuming that a slow usage model is (pre-) selected for finite state machine 350, for example, in a typical user interface operation, like controlling a menu by tilting a phone about an appropriate axis, where the highest frequency is 60 Hz. In such a setting, where the gyroscope is not used very often and the bandwidth is limited, there may be no benefit gained from entering sleep mode 312 prior to transitioning to suspend mode 322. In one embodiment, if no significant movement is detected for a predetermined period of time, e.g.

10 seconds, state machine 350 directly transitions from normal mode 302 to suspend mode 322 to maximize the power savings.

In one embodiment, the magnetometer and the accelerometer remain turned on and are the only sources that continue to provide rotation information to the quaternion output and the raw data virtualizer output. Upon detecting an event or a low accuracy in magnetometer data, state machine 300 transactions back to normal mode 302. The time to recover from a power save condition, e.g., the time between the detection of the event and the transaction from suspend mode 322 back to normal mode 302, should be sufficiently fast to avoid missing any additional events or movement. One skilled in the art will recognize that the complexity of the selected state machine may be increased within the scope of the invention and that intermediate power modes may be added to react to changes in state machine conditions to obtain similar power savings.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

Figure 4:
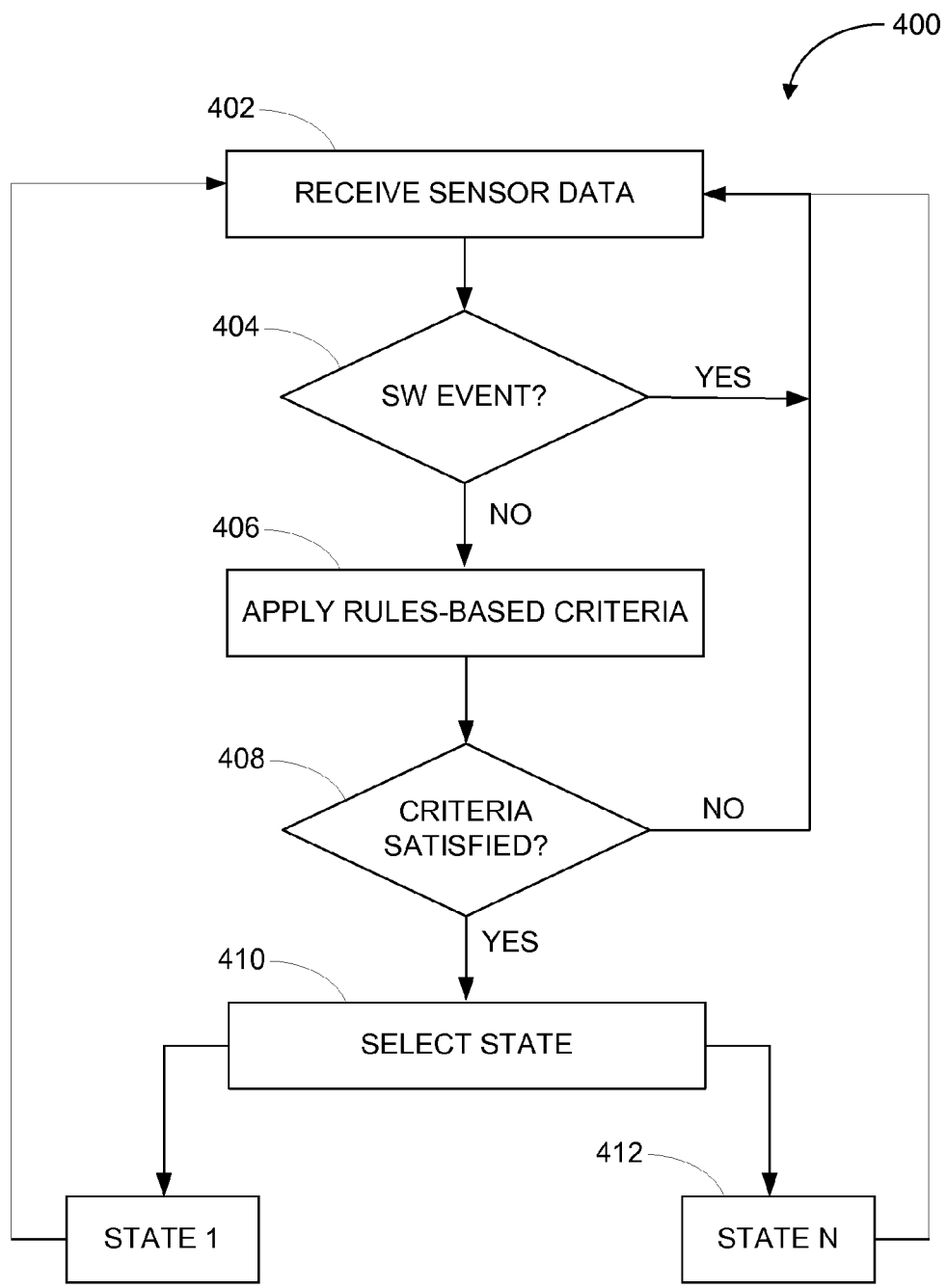
FIG. 4 is a flowchart of an illustrative process for managing sensor power in accordance with various embodiments of the invention.

FIG. 4 is a flowchart of an illustrative process for managing sensor power in accordance with various embodiments of the invention. The process for saving power starts at step 402 when sensor data is received. The sensor data is associated with a one or more sensors that are configured to whom measure rotational movement.

At step 404, the power manager determines the existence of an external event, for example, a software interrupt.

At step 406, one or more rules-based criteria are applied to the sensor data received from the sensors.

At step 408, the power manager determines whether the sensor data satisfies one or more criteria conditions.

In response to that determination, at step 410, the power manager selects one of a plurality of states of operation.

Finally, at step 412, the power manager causes one or more sensors to operate in the selected state. Each state comprises a plurality of modes of operation between which the sensor may be switched to reduce power consumption.

It will be appreciated by those skilled in the art that fewer or additional steps may be incorporated with the steps illustrated herein without departing from the scope of the invention. No particular order is implied by the arrangement of blocks within the flowchart or the description herein.

We claim:

1. A method to reduce sensor power consumption, the method comprising:
   receiving sensor data from one or more sensors, the sensor data attributable to a rotational movement;
   applying a rules-based criterion to the sensor data to determine whether the sensor data satisfies one or more conditions;
   in response to the determination, modulating power consumed by at least one of the sensors by switching between a first mode of operation and a second mode of operation; and
   using a subset of the sensor data to emulate virtual sensor data.

2. The method according to claim 1, wherein the first mode of operation is a sleep mode and the second mode of operation is a suspend mode.

3. The method according to claim 1, further comprising switching one or more sensors from a first state comprising a first set of modes of operation to a second state comprising a second set of modes of operation in response to the determination.

4. The method according to claim 1, wherein a second condition comprises that the sensor data satisfies a reliability criterion.

5. The method according to claim 1, wherein a third condition comprises that one sensor has been at rest for a first predetermined period of time.

6. The method according to claim 1, wherein the determining further comprises comparing a first datum by a first sensor to a second datum of at least a second sensor.

7. The method according to claim 1, wherein second mode of operation comprises partially reducing the power consumption.

8. The method according to claim 1, wherein second mode of operation comprises turning off one or more sensors.

9. The method according to claim 1, wherein a fourth condition is that a bandwidth request is below a second predetermined threshold and a fifth condition is that a detected magnetic inference from magnetic sources is below a predetermined threshold.

10. The method according to claim 1, further comprising generating fused angular data from the sensor data.

11. A fully integrated power management system comprising, the system comprising:
    a plurality of sensors configured to detect and output motion-related sensor data;
    a power management module coupled to receive the sensor data, the power management module is configured to modulate power provided to at least one of the sensors based on the sensor data; and
    a data virtualizer coupled to the power management module, the data virtualizer configured use at least a subset of the sensor data to generate emulated sensor data.

12. The system according to claim 11, wherein the plurality of sensors comprises a gyroscope, an accelerometer, and a magnetometer.

13. The system according to claim 11, wherein the power management module configures at least one of the sensors to operate in a plurality of modes of operation in response to the sensor data.

14. The system according to claim 13, wherein in a first of the plurality of modes of operation comprises both a sleep mode and a suspend mode.

15. The system according to claim 11, wherein the power management module configures at least one of the sensors to operate in a plurality of modes based on a comparison of sensor data obtained from a first sensor and sensor data obtained from a second sensor.

16. The system according to claim 11, wherein the power management module configures at least one of the sensors to operate in one of a plurality of modes in response to receiving information about an external event.

17. The system according to claim 11, wherein the power management module configures at least one of the sensors to operate in a plurality of modes based on the existence of reliability data regarding the plurality of sensors.

18. The system according to claim 11, wherein the power management module configures at least one of the sensors to operate in a plurality of modes based on detecting a movement exceeding a predetermined threshold.

19. The system according to claim 11, further comprising a fusion module to fuse at least a subset of the sensor data.

20. The system according to claim 11, wherein the power management module further comprises a processor to generate a digital sensor control command based on the sensor data.

21. The system according to claim 11, wherein the emulated sensor data comprises virtual gyroscope data.

* * * * *